US008345600B2

(12) United States Patent
Chang

(10) Patent No.: US 8,345,600 B2
(45) Date of Patent: Jan. 1, 2013

(54) REDUCING PROCESSING RESOURCES INCURRED BY A USER INTERFACE

(75) Inventor: John Chang, Stockholm (SE)

(73) Assignee: Skype, Dublin (IE)

( * ) Notice: Subject to any disclaimer, the term of this patent is extended or adjusted under 35 U.S.C. 154(b) by 461 days.

(21) Appl. No.: 12/653,771

(22) Filed: Dec. 17, 2009

(65) Prior Publication Data

US 2011/0013558 A1    Jan. 20, 2011

(30) Foreign Application Priority Data

Jul. 17, 2009    (GB) .................................. 0912507.1

(51) Int. Cl.
*H04Q 7/00* (2006.01)
(52) U.S. Cl. ........................................................ 370/328
(58) Field of Classification Search ........................ None
See application file for complete search history.

(56) References Cited

U.S. PATENT DOCUMENTS

| | | | | |
|---|---|---|---|---|
| 4,804,957 | A * | 2/1989 | Selph et al. | 340/870.03 |
| 7,130,885 | B2 * | 10/2006 | Chandra et al. | 709/206 |
| 7,890,622 | B2 * | 2/2011 | Coca et al. | 709/224 |
| 2002/0135616 | A1 | 9/2002 | Meaden | |
| 2003/0115375 | A1 | 6/2003 | Robison | |
| 2005/0088313 | A1 * | 4/2005 | LeBlanc et al. | 340/825.24 |
| 2006/0146056 | A1 | 7/2006 | Wyatt | |
| 2007/0109275 | A1 | 5/2007 | Chuang | |
| 2008/0037420 | A1 * | 2/2008 | Tang | 370/229 |
| 2008/0100598 | A1 | 5/2008 | Juenger | |
| 2008/0143728 | A1 | 6/2008 | Gorla et al. | |

FOREIGN PATENT DOCUMENTS

| | | |
|---|---|---|
| EP | 0 678 818 A1 | 10/1995 |
| EP | 1 865 664 A2 | 12/2007 |
| EP | 2 015 176 A1 | 1/2009 |
| GB | 2 378 343 A | 2/2003 |
| WO | WO 2005/009019 A2 | 1/2005 |
| WO | WO 2008/085459 A2 | 7/2008 |
| WO | WO-2011006806 | 1/2011 |

OTHER PUBLICATIONS

Great Britain Search Report for Great Britain Application No. GB0912507.1, date of mailing Sep. 25, 2009.
International Search Report from International Application No. PCT/EP2010/059675, Date of Mailing: Sep. 14, 2010, 5 pp.
Written Opinion of the International Searching Authority from International Application No. PCT/EP2010/059675, Date of Mailing: Sep. 14, 2010, 6 pp.

* cited by examiner

*Primary Examiner* — Michael J Moore, Jr.
*Assistant Examiner* — Prenell Jones
(74) *Attorney, Agent, or Firm* — Wolfe-SBMC

(57) ABSTRACT

A method, program and apparatus for limiting processing resources incurred due to refreshing a user interface of a first terminal. The method comprises: at a first terminal, receiving a plurality of event indications which indicate respective events, each of the event indications being received at a different time; and based on the event indications, refreshing the user interface of the first terminal to reflect each of the respective events. Refreshing comprises determining a plurality of time periods, and during each of those time periods postponing the user interface from being refreshed to reflect any outstanding ones of the event indications until that time period has elapsed. The time periods are each determined having a length set in dependence on a timing of the receipt of one or more of the event indications, wherein the length of a later time period is set to an increased value relative to an earlier time period in response to the receipt of one or more of said event indications within a time limit.

25 Claims, 4 Drawing Sheets

REDUCING PROCESSING RESOURCES INCURRED BY A USER INTERFACE

RELATED APPLICATION

This application claims priority under 35 U.S.C. §119 or 365 to Great Britain, Application No. 0912507.1, filed Jul. 17, 2009. The entire teachings of the above application are incorporated herein by reference.

TECHNICAL FIELD

The present invention relates to a method, apparatus and program for limiting the processing resources incurred due to refreshing a user interface.

BACKGROUND

Some communication systems allow the user of a device, such as a personal computer, to communicate across a packet-based computer network such as the Internet. Such communication systems include voice over internet protocol ("VoIP") systems. These systems are beneficial to the user as they are often of significantly lower cost than conventional fixed line or mobile networks. This may particularly be the case for long-distance communication. To use a VoIP system, the user installs and executes client software on their device. The client software sets up the VoIP connections as well as providing other functions such as registration and authentication. In addition to voice communication, the client may also set up connections for other communication media such as video calling, instant messaging ("IM"), SMS messaging, file transfer and voicemail.

One type of communication system for packet-based communication uses a peer-to-peer ("P2P") topology. To enable access to a peer-to-peer system, a user must execute P2P client software provided by a P2P software provider on their computer, and register with the P2P system. When the user registers with the P2P system, the client software is provided with a digital certificate from a server. Once the client software has been provided with the certificate, then calls or other communication connections can subsequently be set up and routed between users of the P2P system without the further use of a server in the set-up. Instead, the client looks up the required IP addresses from information distributed amongst the P2P client software on other end users' computers within the P2P system. That is, the address look-up list is distributed amongst the peers themselves. Once the IP address of a callee's terminal has thus been determined, the caller's P2P client software then exchanges certificates with the callee's P2P client software. The exchange of the digital certificates (or user identity certificates, "UIC") between users provides proof of the users' identities and that they are suitably authorised and authenticated in the P2P system. Therefore, the presentation of digital certificates provides trust in the identity of the users.

It is therefore a characteristic of peer-to-peer communication that, once registered, the users can set up their own communication routes through the P2P system in an at least partially decentralized manner based on distributed address look-up and/or the exchange of one or more digital certificates, without using a server for those purposes. Further details of an example P2P system are disclosed in WO 2005/009019.

VoIP or other packet-based communications can also be implemented using non-P2P systems that do use centralized call set-up, e.g. via server.

Sometimes software programs such as communication clients must respond to asynchronous events, specifically state and/or data changes due to external events such those that occur over a network. To convey these events to the end user, the program must refresh one or more user interface elements on screen. "Refresh" in this context means the process of reading a new data value and then redrawing the value in some user interface element on screen. Example: user A is chatting with user B. When user B sends data or goes offline, such changes must be shown by refreshing the user interface element corresponding to user B on user A's screen.

The most simplistic method is to refresh the user interface directly in response to receiving an indication of such an event. This works well in the common case, but if the rate of incoming event indications is very high then the user interface will be needlessly refreshed too often, causing a performance problem.

One solution to address this performance problem is to provide a periodic timer that fires at a constant interval, e.g. every 1 second. In some implementations, this timer may always be running, regardless of whether there are any incoming events or not. In other implementations, this timer may be enabled only during the period in which there are a rapid succession of incoming events. Either way, the refreshing is done on a simple periodic basis, sometimes referred to as polling.

Another solution is to provide a delay in which refreshing the user interface is put "on hold". Refreshes occur again only until after the delay runs out. In this case, the refresh is not performed at all (i.e. is completely suspended) until the incoming activity has calmed by some amount.

SUMMARY

Despite the existing solutions, the inventor has recognised there is still scope for improving the trade-off between the responsiveness of the user interface and the number of processing cycles used refreshing that user interface.

According to one aspect of the present invention, there is provided a method for limiting processing resources incurred due to refreshing a user interface of a first terminal, the method comprising: at a first terminal, receiving a plurality of event indications which indicate respective events, each of the event indications being received at a different time; and based on the event indications, refreshing the user interface of the first terminal to reflect each of the respective events; wherein said refreshing comprises determining a plurality of time periods, and during each of said time periods postponing the user interface from being refreshed to reflect any outstanding ones of said event indications until that time period has elapsed; and wherein said time periods are each determined having a length set in dependence on a timing of the receipt of one or more of said event indications, the length of a later of said time periods being set to an increased value relative to an earlier of said time periods in response to the receipt of one or more of said event indications within a time limit.

Using this method, the refresh rate is not constant but rather determined relative to the incoming indications of events. For example, when the rate of incoming event indications is low then the user interface may be refreshed immediately. This provides maximum perceived responsiveness. When the rate of incoming event indications is high, the refresh rate may be throttled down. This ensures that the too many processing cycles are not used in refreshing the user interface, e.g. so that user interface updates do not "steal cycles" from other processing required in relation to the events.

In embodiments, said event indications preferably indicate respective events occurring externally to the first terminal.

The method may be a method of limiting processing resources incurred due to refreshing a user interface of a first terminal in a communication system for communicating between the first and other terminals via a packet-based network; and the receipt of said event indications may comprises: at the first terminal of the communication system, receiving a plurality of event indications signalled over the packet-based network to indicate respective events occurring in relation to one or more of the other terminals of the communication system.

The method may comprise receiving further event indications indicative of events occurring locally at the first terminal, and said time periods may be determined in dependence on the timing of receipt of one or more event indications indicating either one of an external and a local event.

The time limit may be the expiry of earlier time period running since last refresh of the user interface.

The time limit may be based on a time interval between the receipt of two event indications.

The event indications may be received asynchronously with respect to the first terminal.

Said refreshing may comprise, during at least one of said time periods, postponing the user interface from being refreshed to reflect an outstanding plurality of said event indications until that time period has elapsed, such that following said time period the user interface is refreshed to reflect the plurality of outstanding event indications in the same refresh operation.

Said time periods may each be determined having a length set according to a substantially exponential back-off process, whereby the length of the later time period is multiplied by a predetermined factor relative to the earlier time period in response to receipt of one or more of said event indications within said time limit.

The method may comprise constraining the length to being set within a maximum cap value.

The length of the later time period may be increased unless fewer than a predetermined number of said event indications are received during the earlier time period. The length of the later time period may be increased unless none of said event indications are received during the earlier time period.

The length of the later timer period may be reset to a lower value if fewer than a predetermined number of event indications are received during the earlier time periods. The length of the later time period may be reset if none of said event indications are received during the earlier time period.

If at least a predetermined number of said event indications are received within the earlier time period running since the last refresh, then next refresh of the user interface may be postponed until the earlier time period has elapsed and the length of the later time period may be increased, the later time period running from the next refresh.

If fewer then a predetermined number of said event indications are received within the earlier time period running since the last refresh, then the next refresh of the user interface may not be postponed and the length of the later time period running from that next refresh may be reset to a lower value.

If any of said event indications arrives within the earlier time period running since the last refresh, then the next refresh of the user interface may be postponed until the earlier time period has elapsed and the length of the later period running from that next refresh may be increased.

If none said event indications arrives within the earlier time period running since the last refresh, then the next refresh of the user interface may not be postponed and the length of the later time period running from that next refresh may be reset to a lower value.

Said time periods may be determined according to the following process:
at program initialisation, set a delay to an initial value, the delay being a variable setting the lengths of said time periods;
upon receiving one of said event indications:
(a) calculate a time difference between a current clock time and a time of last refresh;
(b) if the time difference is greater than the delay:
 (i) perform the user interface refresh and save the current clock time as the time of last refresh,
 (ii) reset the delay to the initial value;
(c) if the time difference is less than the delay:
 (i) if there is no current refresh timer then schedule a refresh timer to fire at the last refresh time plus the delay,
 (ii) if there is already a current refresh timer then do not schedule another refresh timer; when the refresh timer fires:
(d) perform the user interface refresh and save the current clock time as the time of last refresh;
(e) multiply the delay by a predetermined factor.

Although the processing cost of a refresh operation may be less of a problem for higher performance desktop or laptop PCs, it may start to become a particular problem with the rise of VoIP communications implemented on internet-enabled mobile phones, where processing resources are more limited.

Therefore in one particularly advantageous application of the present invention: the first terminal may be a mobile terminal, and said communication system may be a VoIP system, the mobile terminal being installed with a VoIP client for communicating with the other terminals via a mobile cellular network and the internet; the receipt of the event indications may comprise receiving the event indications via the internet and mobile cellular network; and the refreshing may comprise refreshing a user interface of the VoIP client.

According to another aspect of the present invention, there is provided a program product for limiting processing resources incurred due to refreshing a user interface of a first terminal, the program comprising code embodied on a computer-readable medium and being configured so as when executed on the first terminal to: receive a plurality of event indications which indicate respective events, each of the event indications being received at a different time; and based on the event indications, refresh the user interface of the first terminal to reflect each of the respective events; wherein said refreshing comprises determining a plurality of time periods, and during each of said time periods postponing the user interface from being refreshed to reflect any outstanding ones of said event indications until that time period has elapsed; and wherein said time periods are each determined having a length set in dependence on a timing of the receipt of one or more of said event indications, the length of a later of said time periods being set to an increased value relative to an earlier of said time periods in response to receipt of one or more of said event indications within a time limit.

The program product may comprise further code configured to perform any of the additional method steps described herein.

According to another aspect of the present invention, there is provided a first terminal comprising: a receiver configured to receive a plurality of event indications which indicate respective events, each of the event indications being received at a different time; a screen for displaying a user interface; and processing circuitry, coupled to the receiver and screen, configured to refresh the user interface based on the event indications to reflect each of the respective events; wherein the processing circuitry is configured to generate a plurality of time periods, and during each of said time periods to postpone the user interface from being refreshed to reflect any outstanding ones of said event indications until that time period has elapsed; and the processing circuitry is configured to generate each of said time periods having a length set in dependence on a timing of the receipt of one or more of said event indications, the length of a later of said time periods being set to an increased value relative to an earlier of said time periods in response to receipt of one or more of said event indications within a time limit.

The processing circuitry may be further configured in accordance with any of the methods described herein.

BRIEF DESCRIPTION OF THE DRAWINGS

For a better understanding of the present invention and to show how it may be carried into effect, reference will now be made by way of example to the accompanying drawings in which.

DETAILED DESCRIPTION

Figure 1:
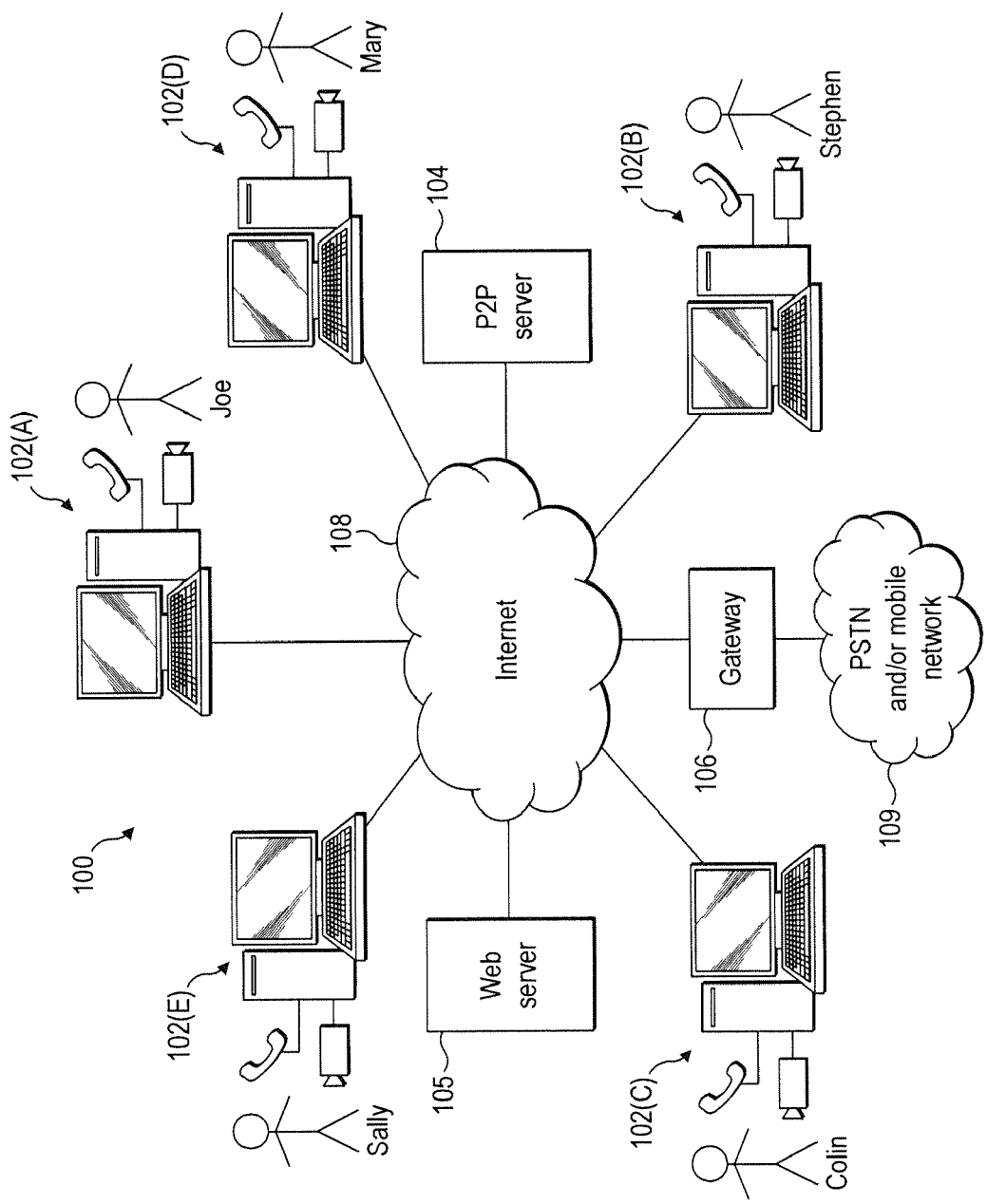
FIG. 1 is a schematic representation of a packet-based network such as the Internet.

FIG. 1 is a schematic illustration of a packet-based network such as the Internet, which comprises a plurality of interconnected elements such as those labelled 102, 104, 105 and 106. Each network element is inter-coupled with the rest of the Internet 108, and is configured to communicate data with other such elements over the Internet by transmitting and receiving data in the form of Internet Protocol (IP) packets. Each element also has an associated IP address locating it within the Internet. The elements shown explicitly in FIG. 1 are: a plurality of end-user terminals 102(A) to 102(E) such as desktop or laptop PCs or Internet-enabled mobile phones; one or more P2P servers 104; one or more web servers 105; and a gateway 106 to another type of network 109 such as to a traditional Public-Switched Telephone Network (PSTN) or other circuit switched network, and/or to a mobile cellular network. However, it will of course be appreciated that many more elements make up the Internet than those explicitly shown. This is represented schematically in FIG. 1 by a communications cloud 108 which will include many other end-user terminals, servers and gateways, as well as routers of Internet service providers (ISPs) and Internet backbone routers.

Each of a plurality of the end-user terminals 102 is installed with communication software in the form of a P2P client application. When executed, this allows the end-user terminals 102 to establish bidirectional communication channels with other such end-user terminals 102 via the Internet using P2P call set-up (or more generally connection set-up). The P2P client applications also share presence information with one another, which provides an availability status of users. The presence information for each user is preferably at least in part defined by the user themselves. To supplement the decentralized call set-up, the P2P client application may retrieve some additional information from the P2P server 104, such as contact lists which provide the names and user IDs of the users' contacts, "avatars" which are images chosen by users to represent themselves within the P2P system.

There may also be a P2P client application installed at one or more gateways 106 coupled to both the Internet 108 and one or more other networks 109 such as a PSTN network and/or a mobile cellular network. This allows the P2P client applications running on end-user terminals 102 to communicate with ordinary land-line telephones and/or mobile telephones respectively, even if those telephones themselves do not run P2P client applications and are not directly coupled to the Internet. In that case, the P2P client application on the terminal 102 sets up a connection over the Internet with the P2P client application on the gateway 106 using P2P call set-up and provides it with a phone number, and the gateway 106 uses the phone number to set up a connection with the telephone over the respective other network. Or in the other direction, a telephone user may dial into the gateway 106 with a number that identifies the user within the P2P system, and the gateway 106 will set up a connection with that user's terminal 102 over the Internet. In either case, a bidirectional communication channel can thus be established via the Internet and PSTN or mobile cellular network.

Each of the end-user terminals 102 may also be installed with other Internet-related software such as a web browser which, when executed, allows the user terminal 102 to retrieve information in the form of web pages from web servers 105 coupled to the Internet 108.

Figure 2:
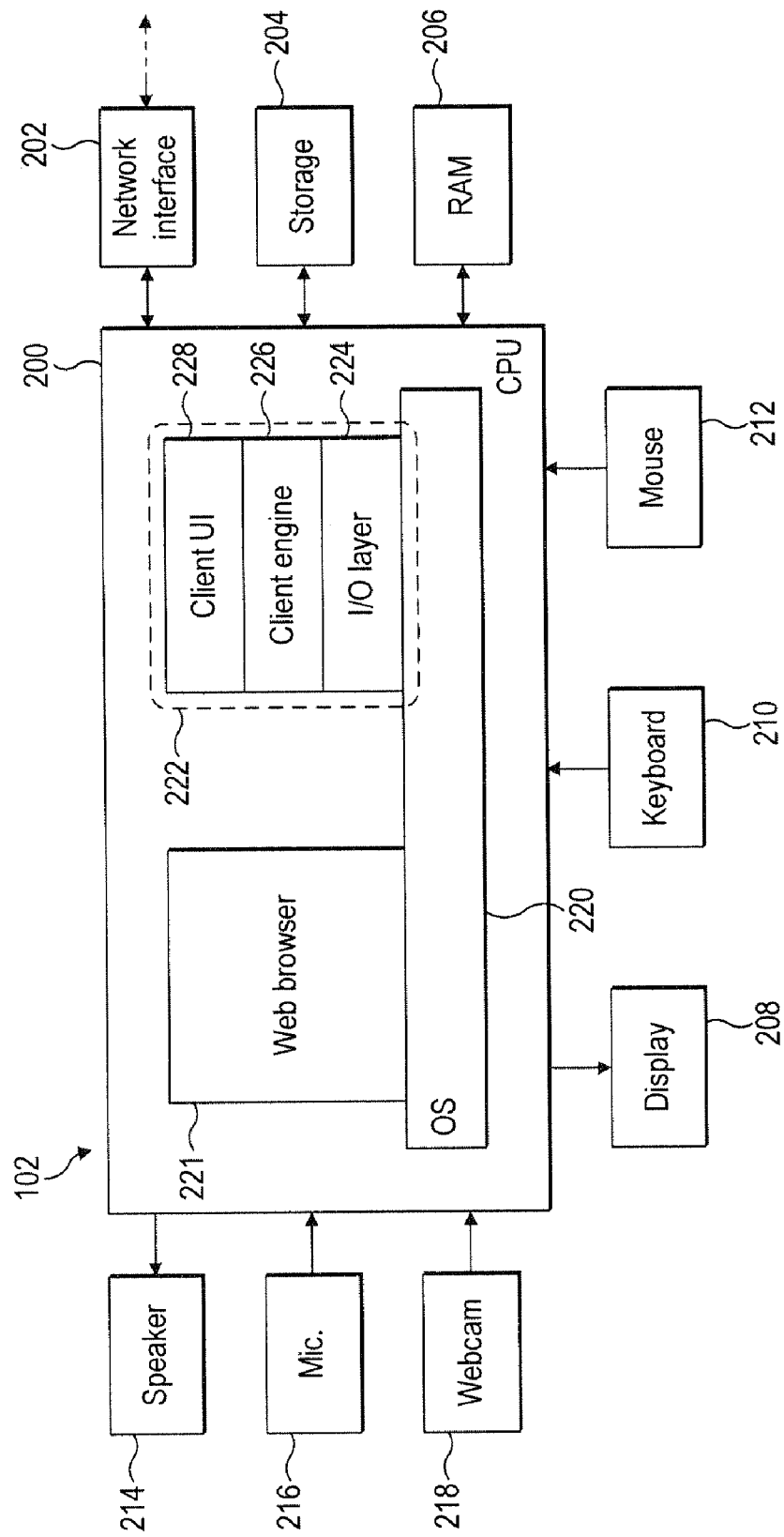
FIG. 2 is a schematic block diagram of a user terminal installed with a web-client application and P2P client application.

The schematic block diagram of FIG. 2 shows an example of an end-user terminal 102, which is configured to act as a terminal of a P2P system operating over the Internet. The terminal 102 comprises a processor or CPU 200 operatively coupled to: a network interface 202 such as modem for connecting to the Internet 108, a non-volatile storage device 204 such as a hard-drive or flash memory, and a volatile memory device such as a random access memory (RAM) 206. The terminal 102 also comprises one or more user input devices, for example in the form of a keyboard or keypad 210, a mouse 208, a microphone 216 and a webcam 218, each operatively coupled to the CPU 200. The terminal 102 further comprises one or more user output devices, for example in the form of a display screen 208 and speaker 214, again each operatively coupled to the CPU 200.

The storage device 204 stores software including at least an operating system (OS) 220, and packet-based communication software in the form of a P2P client application 222. The storage device may also store other Internet-related software such as a web-browser 221. On start-up or reset of the terminal 102, the operating system software 220 is automatically loaded into the RAM 206 and from there is run by being executed on the CPU 200. Once running, the operating system 220 can then run applications such as the web client application 221 and P2P client application 222 by loading them into the into the RAM 206 and executing them on the CPU 200. To represent this schematically in FIG. 2, the operating system 220, web client application 221 and P2P client application 222 are shown within the CPU 200.

The P2P client application 222 comprises a "stack" having three basic layers: an input and output (I/O) layer 224, a client engine layer 226, and a user interface (UI) layer 228. Each layer is responsible for specific functions. Because each successive layer usually communicates with two adjacent layers (or one in the case of the top layer), they are regarded as being arranged in a stack as shown in FIG. 2. The web client application 221 and P2P client application 222 are said to be run "on" the operating system 220. This means that in a multitasking environment they are scheduled for execution by the operating system 220; and further that inputs to the web client application 221 and the lowest (I/O) layer 224 of the P2P client application 222 from the input devices 202, 216 and 218 as well as outputs from web client application 221 and the I/O layer 224 of the P2P client application 222 to the output devices 202, 208 and 214 may be mediated via suitable drivers and/or APIs of the operating system 220.

The I/O layer 224 of the P2P client application comprises audio and/or video codecs which receive incoming encoded streams and decodes them for output to speaker 214 and/or display 208 as appropriate, and which receive unencoded audio and/or video data from the microphone 216 and/or webcam 218 and encodes them for transmission as streams to other end-user terminals 102 of the P2P system. The I/O layer 224 may also comprises a control signalling protocol for signalling control information between terminals 102 of the network.

The client engine 226 then handles the connection management functions of the P2P system as discussed above, such as establishing calls or other connections by P2P address look-up and authentication. The client engine may also be responsible for other secondary functions of the P2P system such as supplying up-to-date contact lists and/or avatar images of the user to the P2P server 104; or retrieving up-to-date contact lists of the user and retrieving up-to-date avatar images of other users from the P2P server 104. Further, the client engine may retrieve presence information from the other clients of the users in the contact list by periodically polling them via a public API, and reciprocally provide its own presence information when polled by those other clients that are online. Exchange of presence information directly between clients via a public API is the preferred option, but alternatively the presence information could be exchanged via an intermediate node such as a server 104.

The UI layer 228 is responsible for presenting decoded video to the user via the display 208, for presenting the output on the display 208 along with other information such as presence and profile information and user controls such as buttons and menus, and for receiving inputs from the user via the presented controls.

Figure 3:
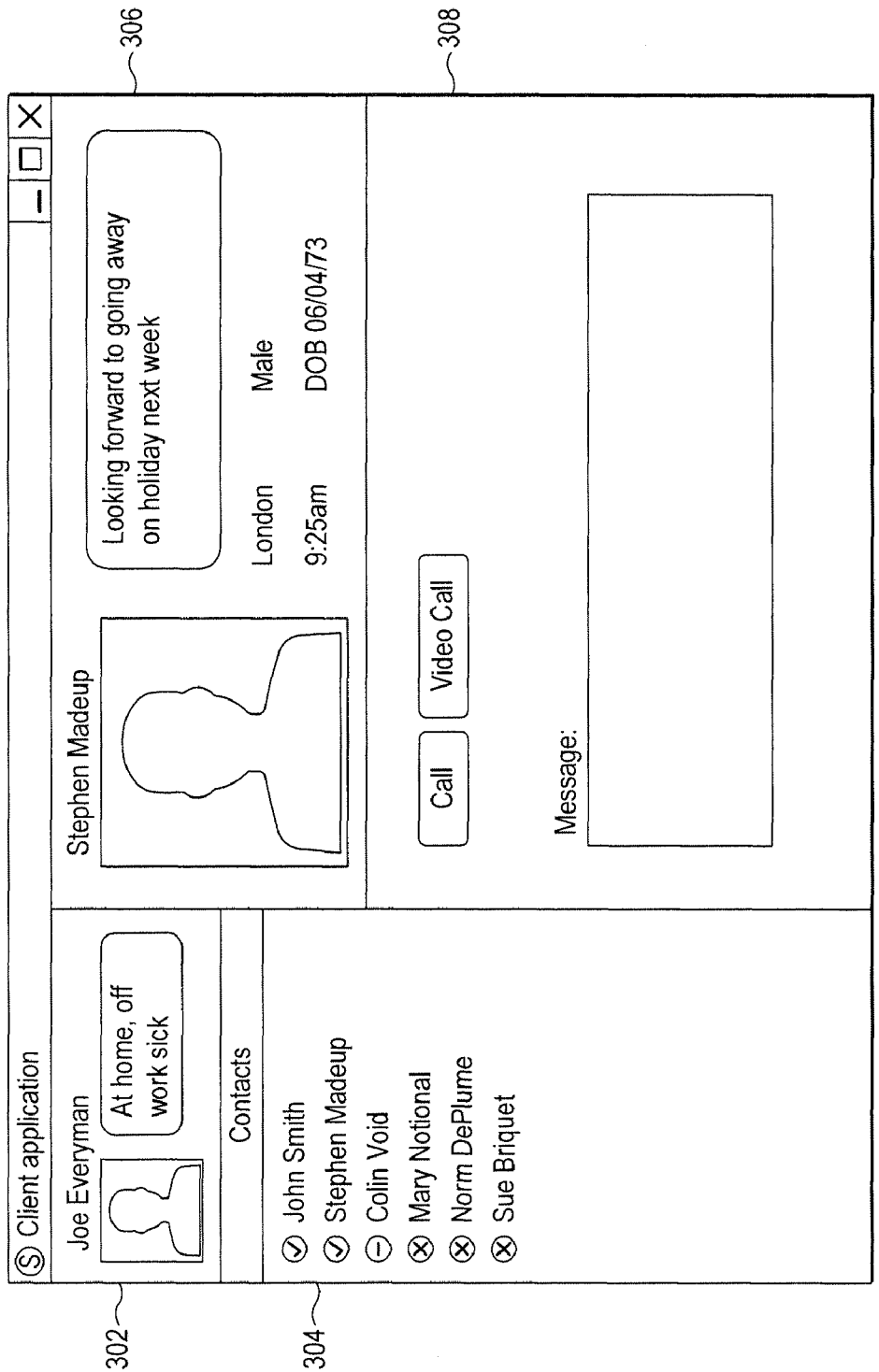
FIG. 3 is a schematic representation of a P2P client application user interface viewed on a user terminal.

FIG. 3 illustrates schematically an example user interface as would be presented to a user on the display 208 when the P2P client application 222 is open for viewing by the user. In this example, the user interface 228 is that of the P2P client application 222 running on a first user terminal 102(A). The user interface is divided into a number of panels. A first panel 302 displays some details of the user's own profile, in this example the user's name "Joe Everyman", an avatar image, and a "mood message". These details may be stored at and retrieved from the P2P server 104 by the client engine 226, so as to be made available to other users of the P2P network. The avatar image is an image chosen by the user to represent themselves to other users (which need not necessarily be a photo of themselves). The mood message is a brief user-defined statement which can be used for any purpose but is typically used to express how the user is feeling, news about recent events in the user's life, or any upcoming plans that may affect the user's availability (the mood message may therefore in some cases be considered a type of presence information). When other users view Joe's profile in their own clients, these details will be visible to them via the P2P server 104, and vice versa the other users' details will be made available to Joe's client (if they are in each others' contact lists).

A second panel 304 of the user interface displays a contact list of the user's friends or associates, these being other users of the P2P network. Entry in the contact list is preferably conditional on agreement from the users. The contact list may be stored at and retrieved from the P2P server by the client engine 226, so that the same list is available to the user uses different instances P2P client application on different terminals. Presence information is also displayed in the panel next to each contact. The presence information represents an availability status which preferably comprises an indication of whether the user is online, and preferably is in part user-defined. For example, the presence status may be: the user is offline (x), the user is online and has selected to be shown as available (√), or the user is online but has selected to be shown as not available (−).

A third panel 306 of the user interface displays the profile of a selected user from the contact list, in this case "Stephen Madeup", a user of another user terminal 102(B). The displayed profile includes Stephen's name, avatar image and mood message, along with other details Stephen may have supplied to the P2P server 104 such as current location, local time, gender and date of birth (DOB). These profile details are retrieved from the P2P server 104 by the client engine 226.

A fourth panel 308 of the user interface then displays communication controls in relation to the selected contact, such as buttons allowing a voice or video call to be established, and a window for entering chat messages. Any incoming chat messages and chat history will be displayed in this panel also, and file transfers may be established by dragging-and-dropping files into the chat window.

As mentioned, the user interface displayed on the screen 208 of a user terminal such as 102(A) will often need to be refreshed in order to reflect events occurring in relation to other, remote terminals of the network, such as other user terminals 102(B . . . E). Indications of these events are signalled to the I/O layer 224 via the network 108. If an event relates to another user terminal 102(B . . . E), then the indication of that event may be signalled either from the other user terminal itself or from a server 104 that has information about that other user terminal. Based on the received indications, the UI layer 228 then handles the refreshing of user interface to reflect the corresponding events.

The events typically do not occur in any particular synchronised manner, and so the event indications typically arrive asynchronously with respect to the receiving user terminal 102(A). That is to say, they arrive at no particular predictable or regular time from the perspective of the receiving terminal 102(A).

Examples of such events are as follows. By way of example, these will be described in terms of a receiving user terminal 102(A) refreshing its user interface based on indications of events occurring in relation to a remote user terminal 102(B), but it will be understood that events can be signalled between any terminals.

One type of event occurs when a remote user's presence has changed, e.g. that user has gone on or off line or has chosen to be shown as unavailable ("do not disturb"). In that case the indication of the event is preferably signalled directly between the users' terminals 102(A) and 102(B) over the network 108, but could alternatively be signalled via a server 104 or a relaying user terminal such as 102(C). Based on the received indication, when the UI layer 228 refreshes the user interface it may for example alter a presence icon such as (x), (√), or (−) displayed in co-location with the remote user's name in the contact list 304 or profile 306.

Another type of event occurs when a remote user's profile information has changed, e.g. the remote user has changed their avatar image or mood message. In that case the indication of the event is preferably signalled to the receiving user terminal 102(A) from the server 104 where the profile information of the remote user is stored, in response to the changed uploaded from the remote user terminal 102(B). Alternatively however, the indication of the event could be signalled directly between the users' terminals 102(A) and 102(B) or via a relaying user terminal such as 102(C). Based on the received indication, when the UI layer 228 refreshes the user interface it will alter the displayed profile 306 accordingly.

Another type of event occurs when there is call activity in relation to a voice or video call. E.g. if the remote user has initiated a call with the receiving user terminal 102(A) or has terminated the call. In that case the indication of the event is preferably signalled directly between the users' terminals 102(A) and 102(B) over the network 108, but could alternatively be signalled via a server 104 or a relaying user terminal such as 102(C). Based on the received indication, when the UI layer 228 refreshes the user interface it may for example display a message or animation in the profile 306 or communication panel 308 notifying the receiving user that the remote user is calling them or has just hung up, or such like.

Another type of event occurs when the remote user terminal 102(B) sends data to the receiving user terminal 102(A), e.g. a chat message which is to be displayed on a screen, or a file transfer whose initiation, status or progress must be indicated on the screen. In that case the indication of the event is again preferably signalled directly between the users' terminals 102(A) and 102(B) over the network 108, but could alternatively be signalled via a server 104 or a relaying user terminal such as 102(C). Based on the received indication, when the UI layer 228 refreshes the user interface it may for example display a message notifying the receiving user of the incoming transfer or its status, or display a percentage or progress bar notifying of the progress of the transfer.

In relation to an IM chat session, yet another type of event may occur if the client applications of the receiving and remote terminal 102(A) and 102(B) support a "typing indicator" feature. The typing indicator provides a notification to the receiving user that the remote user is currently typing. E.g. a visual animation such as a scribbling pencil may be displayed in the communication panel 308 based on an indication received at the receiving terminal 102(A) to indicate the event that the remote user is typing. The indication may also indicate the kind of typing activity, e.g. so that the displayed notification distinguishes between the typing of words and pressing the delete key. The typing indicator helps avoid confusion that could otherwise be caused by crossed chat messages. In the case of the indication of chat activity, the indication of the event is preferably signalled directly between the users' terminals 102(A) and 102(B) over the network 108, but could alternatively be signalled via a server 104 or a relaying user terminal such as 102(C).

Another type of event is a history event such as a missed call or an available voicemail. In that case the indication of the event is preferably signalled to the receiving user terminal 102(A) from the server 104 where the information about the missed call or voicemail is stored, in response to the attempted call from the remote user terminal 102(B). Alternatively however, the indication of the event could be signalled directly between the users' terminals 102(A) and 102 (B) or via a relaying user terminal such as 102(C). Based on the received indication, when the UI layer 228 refreshes the user interface it will insert a notification of the missed call or voicemail somewhere appropriate in the user interface.

At any time, various different indications of any of these or other types of events may be arriving at the receiving terminal 102(A) asynchronously, and furthermore some may arrive within a short space of time of each other. If the user interface has to be refreshed straightaway every time an indication of a new event arrives, then a large number of processing cycles may be incurred by repeatedly updating the user interface.

The inventor has identified two particular situations where such events can tend to cause performance problems. The first is on launch of the client (especially first launch), when the contact list is synchronised and many "property changed" indications are received. The second also occurs on launch (especially first launch), when chats and chat messages are synchronised. E.g. if the user has been using chat on one device and then switches to another device, he or she might log in and receive hundreds if not thousands of chat messages when the client syncs.

However, more generally, it will be appreciated that the described performance problem can occur in any situation where multiple event indications arrive.

To try to solve this, the idea is that if the events are close enough together in time then the refreshing of the user interface to reflect one or more of them can be postponed without the user perceiving a significant lack of responsiveness. If a refresh operation involves refreshing a part of the user interface reflecting multiple events (or even the whole user interface), then this may mean that one or more outstanding events can be "saved up" and then multiple events handled in the same refresh operation. Because the refresh operations may involve animations or other significant transitions (such as re-sorting the contact list or auto-scrolling to the newest chat messages), it is advantageous to collect multiple changes into a single operation so the display and processor are not encumbered with multiple successive refresh operations. E.g. otherwise this could cause the screen to flit from one update to another which would be distracting for the user and make the user interface awkward to use. But even if different elements of the user interface are refreshed separately to reflect individual respective events, then there may still be a performance advantage in postponing a refresh until a later time when there are fewer other refresh operations or other processing operations relating to the handling of the events themselves such as data processing operations. For example, postponing the refresh can also be advantageous so that the program remains responsive in case the user is trying to scroll, type, etc. during this time.

As mentioned, there are some existing solutions. Nonetheless, it would still be desirable to try to optimize the trade-off between the responsiveness of the user interface and the number of processing cycles used refreshing that user interface.

According to preferred embodiments of the present invention, the improved solution is to algorithmically determine the period of time during which refreshes are postponed, based on the receipt of incoming event indications. An algorithm for increasing such a time period may be referred to herein as a "back-off" algorithm. The algorithm preferably has the effect that a greater rate of incoming events tends to result in a greater time period. For example, the algorithm may have the effect that when the rate of incoming events is low then the user interface will be refreshed immediately. This provides maximum perceived responsiveness. When the rate of incoming events is high however, the refresh rate may be throttled down. This ensures that the user interface updates do not divert processing cycles from other processing that may be required at the receiving terminal 102(A), either in relation to handling the events or otherwise.

The back-off algorithm works by setting a plurality of time periods during which refreshes are postponed. These may be referred to herein as delay periods, each preferably being measured from a respective time of last refresh. Any event indication that is received within such a delay period does not result in the user interface being refreshed immediately, but instead the user interface is only refreshed to reflect all outstanding event indications once the delay period has elapsed.

Preferably, the back-off algorithm operates such that the length of the delay period is increased between an earlier to a later time period unless no event indications are received during the earlier time period. Further, the length of the delay period is preferably reset to some lower value if no indications are received during one of the delay periods.

A particularly preferred algorithm can be summarised by the following statement: if an indication of an event arrives within the current delay period running since the time of last refresh, then the refreshing of the user interface to reflect that event is postponed until that delay period has elapsed, and the next delay period running from that refresh will be increased in length; but otherwise, if an indication of an event arrives only after the delay period since the time of last refresh, then there is no need to postpone the refreshing of the user interface when the next event does arrive and the length of the next delay period running from the next refresh will be reset.

Optionally, the increase and/or resetting of the length of the delay period need not necessarily be based on whether no events at all were received within the delay period. Alternatively, one or both of these actions could be based on whether there were fewer than a predetermined number of events received within that period.

Preferably the algorithm is a substantially exponential back-off algorithm, whereby the length of the next delay period is multiplied by a factor in response to asynchronous incoming events. In embodiments the multiplication is applied when the last delay period has elapsed and the user interface refreshed, and at least one event indication was received during that last delay period.

In some implementations, a maximum cap may be applied to the delay so that even during a steady stream of incoming events, the user interface is still updated somewhat periodically.

An example back-off algorithm is now described.

At program initialisation, set the delay to a small constant value, e.g. 0.1 seconds.

Upon receiving an incoming indication of an event:
(a) Calculate the time difference between the current clock time and the time of the last refresh.
(b) If the time difference is greater than the delay:
(i) Perform the user interface refresh immediately, and save the current clock time.
(ii) Reset the delay to the initial value.
(c) If the time difference is less than the delay:
(i) If there is no current refresh timer, schedule a one-shot timer to fire at the last refresh time+the delay.
(ii) If there is a current refresh timer, do nothing. The timer will handle the refresh at the scheduled time.

When the refresh timer fires:
(d) Perform the user interface refresh immediately, and save the current clock time.
(e) Multiply the delay by a fixed factor, e.g. 2.

Figure 4:
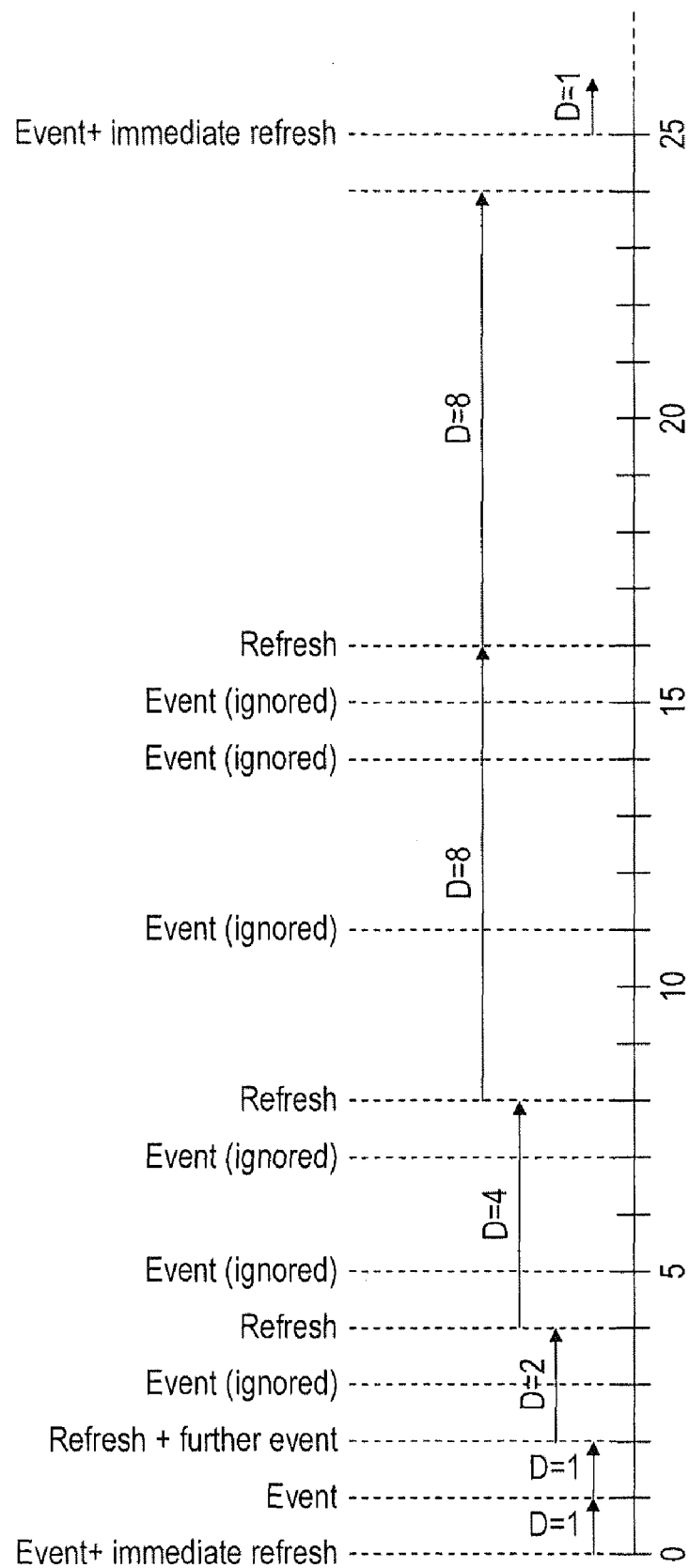
FIG. 4 is a timeline showing an example operation of a UI refresh back-off algorithm.

An example operation of this algorithm is set out in the example below, and also illustrated in the timeline of FIG. 4.
Time Description
[00:00:00] Incoming event indication
[00:00:00]<--Refresh immediately (Delay=1)
[00:00:01] Incoming event indication//timer scheduled for 0:00:02
[00:00:02]<--Timer refresh (new Delay=2)
[00:00:02] Incoming event indication//timer scheduled for 0:00:04
[00:00:03] Incoming event indication//ignored
[00:00:04]<--Timer refresh (new Delay=4)
[00:00:04] Incoming event indication//timer scheduled for 0:00:08
[00:00:05] Incoming event indication//ignored
[00:00:07] Incoming event indication//ignored
[00:00:08]<--Timer refresh (new Delay=8)
[00:00:09] Incoming event indication//timer scheduled for 0:00:16
[00:00:11] Incoming event indication//ignored
[00:00:14] Incoming event indication//ignored
[00:00:15] Incoming event indication//ignored
[00:00:16]<--Timer refresh (new Delay=8)
:
[00:00:25] Incoming event
[00:00:25]<--Refresh immediately (Delay=1)

In this example, at some time arbitrarily referred to as t=0 an event indication arrives for the first time since program initialisation. There is no defined time of last refresh, so the user interface is refreshed straightaway. Suppose then that at a subsequent time t=1, another event indication arrives. This is within the initial delay period D=1 of the last refresh, and therefore according to the algorithm the user interface is not refreshed straightaway but instead a refresh timer is set to fire (actuate) at the initial delay time D=1 plus the time of last refresh t=1, i.e. at time t=2. When the refresh timer then does fire at time t=2, the user interface is refreshed to reflect the events indicated by the outstanding indications. Also when the refresh timer fires, the length of the delay period is multiplied by a predetermined factor, in this example 2, thus setting the delay period to D=2.

Now suppose yet another event indication arrives at time t=2 (but not in time to be included in the refresh scheduled for t=2). This is within the new delay period D=2 of the last refresh, and therefore the user interface is not refreshed straightaway, and a refresh timer is scheduled for the new delay time D=2 plus the time of last refresh t=2, i.e. scheduled for t=4. In the meantime, a further event indication may arrive at time t=3 but this will also be ignored until the timer fires at time t=4. When the refresh timer then does fire at time t=4, the user interface is refreshed to reflect the events indicated by both outstanding indications, preferably as part of the same refresh operation and thus saving processor cycles since two separate refresh operations are not required at separate times to reflect each individually. Also when the refresh timer fires, the length of the delay period is multiplied again by the predetermined factor 2, thus setting the delay period to D=4.

Now suppose a yet further event indication arrives at time t=4 (but not in time to be included in the refresh scheduled for t=4). This is within the new delay period D=4 of the last refresh, and therefore the user interface is not refreshed straightaway, and a refresh timer is scheduled for new delay time D=4 plus the time of last refresh t=4, i.e. scheduled for t=8. In the meantime, yet more event indications may arrive for example at times t=5 and t=7 but these will also be ignored until the timer fires at time t=8. When the refresh timer then does fire at time t=8, the user interface is refreshed to reflect the events indicated by all three outstanding indications, preferably as part of the same refresh operation and thus saving processor cycles since three separate refresh operations are not required at separate times to reflect each individually. Also when the refresh timer fires, the length of the delay period is multiplied again by the predetermined factor 2, thus setting the delay period to D=8.

Now suppose a yet further event indication arrives at time t=9, after the refresh performed at t=8. This is within the new delay period D=8 of the last refresh, and therefore the user interface is not refreshed straightaway, and a refresh timer is scheduled for new delay time D=8 plus the time of last refresh t=8, i.e. scheduled for t=16. In the meantime, yet more event indications may arrive for example at times t=11, t=14 and t=15 but these will also be ignored until the timer fires at time t=16. When the refresh timer then does fire at time t=16, the user interface is refreshed to reflect the events indicated by all the outstanding indications. The length of the delay period would also be multiplied by 2 again, except in this example the length is capped at a maximum of 8.

Then say for example that no more event indications arrive until a later time t=25. The delay period expired at t=24 (the time of last refresh t=16 plus the delay D=8). Therefore according to the algorithm, the user interface is refreshed straightaway upon receiving the indication at t=25, and the delay period is reset to its lowest value of D=1.

The present invention has a particularly advantageous application to an internet-enabled mobile phone. In that case the modem 202 is a wireless cellular modem for connecting to the internet via a mobile cellular network. In preferred embodiments, this is distinct from the situation described earlier in relation to FIG. 2 whereby a mobile phone not installed with a VoIP or P2P client is able to still access the VoIP or P2P system via a client application running on the gateway 106. Rather, a client application is installed and run directly on the mobile phone itself. In that case the mobile terminal can be considered one of the user terminals 102 shown schematically in FIG. 2, although some kind of gateway to the internet 108 will typically still be involved as part of the mobile network operators' infrastructure.

As mentioned, this is a particularly advantageous application of the invention since the processing cost of a refresh operation may start to become a particular problem with the rise of VoIP communications implemented on internet-enabled mobile phones, where processing resources are more limited than in more conventional PC based applications (although the present invention can still have a benefit for PCs or other types of terminal as well).

It will be appreciated that the above embodiments are described only by way of example.

For instance, the above is only an example of a back-off algorithm. It will be appreciated given the disclosure herein that any back-off algorithm could be used whereby the length of time period for which the refresh is postponed increases with some measure of the number, rate or timing of incoming event indications. For example, instead of measuring the time between arrival of an event indication and the time of last refresh, e.g. as in step (a) above, the algorithm could alternatively or additionally measure the time interval between the arrival of two or more event indications and set the delay period in dependence on that interval. Or the algorithm could operate by measuring an average incoming rate $R_{av}$ of event indications and calculating the length of the delay period D by a function $D = f(R_{av})$, where the preferred form off may be determined by simulation or empirical testing of different trial functions.

Also note that "rate" does not necessarily mean a regular rate, but more generally can refer to any measure of a number of event indications received per unit time, during any window of time, whether regular or not.

During the delay period, it is not necessarily the case that all incoming event indications of all kinds are ignored. Where it is referred to receiving a plurality of event indications or similar, this could refer only to a certain set or type of event indications, and where it is referred to postponing the refresh to reflect any indications this could only mean any indications of that type or set.

Where it is said that an event indication arrives or is received from an external source, the receipt or arrival need not necessarily refer to the immediate capture from the external medium into the terminal. Instead, it may also involve some amount of buffering and/or data processing. That is, the "receipt" or "arrival" of the indication may actually refer to the meaningful recognition of the indication by the algorithm in question rather than the physical receipt or arrival. In some cases for example, when the client is launched after a certain time, it may receive a plurality of event indications that have been stored or cached during that time either locally or at a remote terminal such as a server. Either way, the indications may still indicate external events even though they have been stored for a time before being received by the client's refresh algorithm.

In addition to external events occurring over the network, the algorithm could also take into account local events such as from those originating from peripherals, e.g. like mouse clicks or keyboard events. These could occur for example when the local user changes his or her own presence or profile information or types a chat message, etc. Though preferably the algorithm would at least take into account external events occurring over the network.

Although the above has been described mainly in terms of a peer-to-peer (P2P) system, the present invention is not specific to P2P and may be applied to any kind of packet-based communications system, such as more the centralised VoIP systems mentioned previously. Further, the present invention is not limited to use over the Internet, but could be implemented over any packet-based network.

Further, the present invention is not limited only to refreshing a user interface to reflect events signalled over a network or as part of a communication system. More generally, the present invention can be applied to optimize the refreshing of a user interface to reflect any external event occurring externally to the receiving terminal, or even internally.

In preferred embodiments, the refresh back-off algorithm is implemented by software stored on a general purpose memory such as flash memory or hard drive an executed on a general purpose processor, the software preferably but not necessarily being integrated as part of the client application. However, alternatively the algorithm could be implemented in firmware or even in dedicated hardware. The algorithm could be any type of process, e.g. it could comprise a series of conditional steps such as those described above, and/or an equation like $D = f(R_{av})$, and/or it could comprise referring to a look-up table.

Other configurations and applications of the present invention may be apparent to the person skilled in the art given the disclosure herein. The scope of the invention is not limited by the described embodiments, but only by the appended claims.

What is claimed is:

1. A method comprising:
   receiving, at a first terminal, a plurality of event indications which indicate respective events, each of the event indications being received at a different time; and
   based on the event indications, refreshing a user interface of the first terminal to reflect each of the respective events the refreshing comprising determining a plurality of time periods, and during each of said time periods postponing the user interface from being refreshed to reflect any outstanding ones of said event indications until that time period has elapsed, and a length of each of said time periods determined based on a timing of the receipt of one or more of said event indications, the length of a later of said time periods being set to an increased value relative to an earlier of said time periods in response to receiving at least a predetermined number of said event indications within a time limit, and the length of the later of said time periods being reset to a lower value in response to receiving fewer than the predetermined number of said event indications within the time limit.

2. The method of claim 1, wherein said event indications indicate respective events occurring externally to the first terminal.

3. The method of claim 2, wherein the first terminal is configured to communicate in a communication system with other terminals via a packet-based network, and wherein receiving the plurality of event indications comprises receiving the plurality of event indications signalled over the packet-based network to indicate respective events occurring in relation to one or more of the other terminals of the communication system.

4. The method of claim 2, further comprising receiving further event indications indicative of events occurring locally at the first terminal, said time periods being determined based on the timing of receipt of one or more event indications indicating either one of an external and a local event.

5. The method of claim 1, wherein the time limit is the expiry of the earlier time period running since last refresh of the user interface.

6. The method of claim 1, wherein the time limit is based on a time interval between receiving two event indications.

7. The method of claim 1, wherein the event indications are received asynchronously with respect to the first terminal.

8. The method of claim 1, wherein said refreshing comprises, during at least one of said time periods, postponing the user interface from being refreshed to reflect an outstanding plurality of said event indications until that time period has elapsed, such that following said time period the user interface is refreshed to reflect the plurality of outstanding event indications in the same refresh operation.

9. The method of claim 1, wherein said time periods are each determined having a length set according to a substantially exponential back-off process, whereby the length of the later time period is multiplied by a predetermined factor relative to the earlier time period in response to receiving one or more of said event indications within said time limit.

10. The method of claim 1, comprising constraining the length to being set within a maximum cap value.

11. The method of claim 1, wherein the length of the later time period is increased unless fewer than the predetermined number of said event indications are received during the earlier time period.

12. The method of claim 11, wherein the length of the later time period is increased unless none of said event indications are received during the earlier time period.

13. The method of claim 1, wherein the length of the later time period is reset if none of said event indications are received during the earlier time period.

14. The method of claim 5, wherein, if at least the predetermined number of said event indications are received within the earlier time period running since the last refresh, then a next refresh of the user interface is postponed until the earlier time period has elapsed and the length of the later time period is increased, the later time period running from the next refresh.

15. The method of claim 14, wherein, if fewer than the predetermined number of said event indications are received within the earlier time period running since the last refresh, then the next refresh of the user interface is not postponed and the length of the later time period running from that next refresh is reset to a lower value.

16. The method of claim 15 wherein, if any of said event indications arrives within the earlier time period running since the last refresh, then the next refresh of the user interface is postponed until the earlier time period has elapsed and the length of the later period running from that next refresh is increased.

17. The method of claim 16 wherein, if none of said event indications arrives within the earlier time period running since the last refresh, then the next refresh of the user interface is not postponed and the length of the later time period running from that next refresh is reset to a lower value.

18. The method of claim 1, wherein said time periods are determined according to the following process:
at program initialisation, set a delay to an initial value, the delay being a variable setting the lengths of said time periods;
upon receiving one of said event indications:
(a) calculate a time difference between a current clock time and a time of last refresh;
(b) if the time difference is greater than the delay:
(i) perform the user interface refresh and save the current clock time as the time of last refresh,
(ii) reset the delay to the initial value;
(c) if the time difference is less than the delay:
(i) if there is no current refresh timer then schedule a refresh timer to fire at the last refresh time plus the delay,
(ii) if there is already a current refresh timer then do not schedule another refresh timer;
when the refresh timer fires:
(d) perform the user interface refresh and save the current clock time as the time of last refresh;
(e) multiply the delay by a predetermined factor.

19. The method of claim 3, wherein:
the first terminal is a mobile terminal, and said communication system is a VoIP system, the mobile terminal being installed with a VoIP client for communicating with the other terminals via a mobile cellular network and the internet;
the receiving the event indications comprises receiving the event indications via the internet and mobile cellular network; and
the refreshing comprises refreshing a user interface of the VoIP client.

20. A program product comprising code embodied on a computer-readable medium, the computer-readable medium not comprising a signal, the program product being configured so as when executed on a first terminal to:
receive a plurality of event indications which indicate respective events, each of the event indications being received at a different time; and
based on the event indications, refresh the user interface of the first terminal to reflect each of the respective events, the refreshing comprising determining a plurality of time periods, and during each of said time periods postponing the user interface from being refreshed to reflect any outstanding ones of said event indications until that time period has elapsed, and a length of each of said time periods determined based on a timing of the receipt of one or more of said event indications, the length of a later of said time periods being set to an increased value relative to an earlier of said time periods in response to receiving at least a predetermined number of said event indications within a time limit, and the length of the later of said time periods being reset to a lower value in response to receiving fewer than the predetermined number of said event indications within the time limit.

21. The program product of claim 20, the program product being a communication client application for communicating between the first terminal and other terminals via a packet-based network, the communication client comprising code configured so as when executed on the first terminal:

the receipt of said event indications comprises: at the first terminal of the communication system, receiving a plurality of event indications signalled over the packet-based network to indicate respective events occurring in relation to one or more of the other terminals of the communication system.

22. The program product of claim 21, wherein the first terminal is a mobile terminal, the communication client being a VoIP client for communicating between the mobile terminal and the other terminals via a mobile cellular network and the internet, the VoIP client comprising code configured so as when executed on the mobile terminal:

the receipt of the event indications comprises receiving the event indications via the internet and mobile cellular network; and the refreshing comprises refreshing a user interface of the VoIP client.

23. A first terminal comprising:

a receiver configured to receive a plurality of event indications which indicate respective events, each of the event indications being received at a different time;

a screen for displaying a user interface; and processing circuitry, coupled to the receiver and the screen, configured to refresh the user interface based on the event indications to reflect each of the respective events;

the processing circuitry configured to generate a plurality of time periods, and during each of said time periods to postpone the user interface from being refreshed to reflect any outstanding ones of said event indications until that time period has elapsed; and the processing circuitry configured to generate each of said time periods to have a length based on a timing of the receipt of one or more of said event indications, the length of a later of said time periods being set to an increased value relative to an earlier of said time periods in response to receiving at least a predetermined number of said event indications within a time limit, and the length of the later of said time periods being reset to a lower value in response to receiving fewer than the predetermined number of said event indications within the time limit.

24. The first terminal of claim 23, wherein:

the first terminal comprises a transceiver for communicating with other terminals via packet-based network, the transceiver including said receiver and the receiver being configured to receive a plurality of event indications signalled over the packet-based network to indicate respective events occurring in relation to one or more of the other terminals; and the processing circuitry comprising a memory and processor coupled to the transceiver, the screen and the memory, the memory storing a communication client application comprising code configured so as when executed on the processor to enable communication between the first terminal and other terminals via the transceiver and packet-based network, and to perform said refreshing of the user interface.

25. The first terminal of claim 24, wherein:

the first terminal is a mobile terminal;

the transceiver is configured to communicate via a mobile cellular network and the internet, the receiver being configured to receive the event indications via the internet and mobile cellular network;

the communication client is a VoIP client configured so as when executed on the processor to enable communication between the first and the other terminals via the transceiver, mobile cellular network and internet.

* * * * *